United States Patent
Igel et al.

(10) Patent No.: US 6,346,675 B1
(45) Date of Patent: Feb. 12, 2002

(54) COUPLING AND METHOD FOR ITS MANUFACTURE

(75) Inventors: Günter Igel, Teningen; Hans-Jürgen Gahle, Emmendingen; Mirko Lehmann, Freiburg, all of (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/506,635

(22) Filed: Feb. 18, 2000

(30) Foreign Application Priority Data

Feb. 19, 1999 (DE) .......................................... 199 07 165

(51) Int. Cl.$^7$ ................................................ H02G 3/18
(52) U.S. Cl. ........................ 174/65 R; 174/135; 16/2.1; 248/50
(58) Field of Search ........................... 174/65 SS, 65 R, 174/65 G, 135, 152 G, 153 G, 153 R, 93, 152 GM; 16/2.1, 2.2; 248/56, 68.1; 439/274, 275, 604

(56) References Cited

U.S. PATENT DOCUMENTS

| | | | |
|---|---|---|---|
| 3,901,772 A | * | 8/1975 | Guillotin et al. ..... 174/152 GM |
| 4,292,464 A | * | 9/1981 | Vogt et al. ........... 174/152 GM |
| 4,792,204 A | | 12/1988 | Praeur et al. |
| 5,194,697 A | * | 3/1993 | Hegner et al. .............. 174/151 |
| 5,569,575 A | | 10/1996 | Yamashita |
| 6,111,198 A | * | 8/2000 | Tower ...................... 174/65 R |

FOREIGN PATENT DOCUMENTS

| | | | | |
|---|---|---|---|---|
| GB | 2269945 | * | 2/1994 | .............. 174/65 G |
| JP | 57-161819 | | 10/1982 | |

OTHER PUBLICATIONS

Franz Czeschka "Plug-in Connectors for SMT", SMT International Conference (Products–Manufacture–Processing), pp. 207 & 222, Huber A. Holzmann (1987) No date.

Anton Heuberger, *Micromechanics*, pp. 445–456 "Springer–Verlag " (1989). No Date.

* cited by examiner

Primary Examiner—Dean A. Reichard
Assistant Examiner—Dhiru R Patel
(74) Attorney, Agent, or Firm—Akin, Gump, Strauss, Hauer & Feld, L.L.P.

(57) ABSTRACT

A coupling (1) has a coupling receiver (2) and a coupling counterpart (3) connectable with it, which in the coupling position is held in a receiver depression (6) of the coupling receiver. The receiver depression (6) is arranged in a layer stack (4) with at least two layers (5a, 5b, 5c, 5d, 5e). Proceeding from the flat surface of the layer stack (4) bordering upon the recess depression (6) to the interior of the receiver depression (6), the lateral boundary wall of the recess depression (6) has at least one cutback, which is formed by a receding layer (5a, 5c) or a receding layer area. The coupling counterpart (3) has at least one lateral guide and/or locking projection (9a, 9b), which engages into a cutback (8a, 8b) of the component (2) in the coupling position.

15 Claims, 3 Drawing Sheets

COUPLING AND METHOD FOR ITS MANUFACTURE

BACKGROUND OF THE INVENTION

The invention relates to a micro-mechanical coupling having a coupling receiver and a coupling counterpart, which is held in a receiving depression of the coupling receiver. The invention moreover relates to a process for manufacturing such a coupling.

From "Plug-in Connectors for SMT," *SMT International Conference* (Products-Manufacture-Processing), page 222, Hubert A. Holzmann (1987), a micro-mechanical coupling of the type mentioned at the outset is already known where, as coupling receiver, a printed circuit is provided which is penetrated transversely to its plate level by a receiver depression, into which a pointed press-in pin is inserted. The coupling counterpart forms, together with the receiver depression, a press fit which fixes the coupling counterpart in the coupling receiver in a friction-locking manner. This previously known coupling has the disadvantage that the press fit brings about tensile stress in the coupling receiver which diminishes the mechanical strength of the coupling receiver. The formation of cracks can even occur in the area of the press fit in the coupling receiver.

From the book *Micromechanics* by Anton Heuberger, page 456, Springer-Verlag (1989), a coupling of the type mentioned at the outset is already known, where the coupling receiver is a semiconductor chip having a large number of V-shaped receiver depressions on one of its surfaces, which run respectively along a straight line on the surface of the semiconductor chip. Into the respective V-shaped receiver depressions, in the direction of travel of the receiver depression, an end region of a fiber-like optical conductor is installed. The coupling is constructed as a transceiver array, and has on the one hand receiver conductors, the ends of which are arranged adjacent to the optical receiving elements situated on the semiconductor chip, and on the other hand has coupling transmitter conductors, the ends of which are arranged adjacent to optical transmitting elements situated on the semiconductor chips, which are connected with the receiving elements through an amplifier and drive unit.

This previously known coupling has the disadvantage that the V-shaped receiver depressions occupy a not inconsiderable portion of the chip surface of the semiconductor, which can be used for the optical and electronic components located on the semiconductor chip, such as the amplifier and drive unit as well as the optical transmitting and receiving elements. This previously known coupling therefore has, on the one hand, comparatively large dimensions and, on the other hand, the manufacturing costs for the coupling are correspondingly high, as these rise out of proportion with increasing chip surface. Moreover, it is not beneficial that the V-shaped receiver depressions cannot be integrated into a wafer at all or can be only poorly integrated with standard processes usual in chip manufacture. A further disadvantage of the coupling is that the optical conductors are clamped in between the walls of the V-shaped receiver depressions in order to fix the conductors axially in the receiver depression. Through the clamping force exerted here on the conductor, mechanical tensions can arise in the optical conductor, which can alter the optical properties of the conductor.

SUMMARY OF THE INVENTION

There thus exists an object of creating a coupling of the type mentioned at the outset, which has a compact construction as well as a mechanically stable connection between the coupling receiver and the coupling counterpart. Furthermore, there exists an object of providing a process, which allows a simple and economical manufacture of such a coupling.

This object is achieved, in relation to the coupling, by the coupling receiver having a stack of layers with at least two layers, by the receiver depression being arranged in the layer stack and extending transversely in relation to its layer planes over more than one layer, by the lateral boundary wall of the receiver depression, proceeding from the surface of the layer stack bordering on the receiver depression toward the interior of the receiver depression, having at least one cutback which is formed by a layer cutback in relation to an adjacent layer or a cutback layer region, and by the coupling counterpart having laterally at least one guide projection and/or locking projection (hereinafter simply "locking projection") which, in the coupling position, engages into the cutback of the micro-mechanical component.

The coupling counterpart is thus fixed form-locking in the receiver depression, avoiding clamping forces, whereby mechanical strains in the coupling receiver are avoided as far as possible. The coupling thereby permits a stable connection of its coupling elements. Since the receiver depression extends transverse to the layer planes of the layer stack, the receiver depression occupies only a comparatively small area of the surface of the coupling receiver, which makes possible correspondingly compact dimensions of the coupling. With a coupling receiver constructed as a semiconductor chip, chip surface can consequently be saved, which allows a correspondingly economical manufacture of the semiconductor chip. Moreover, in connection with the manufacture of the coupling, the receiver depression arranged in the layer stack enables a simple, layer by layer application of the cutback or cutbacks into the boundary wall of the receiver depression, whereby customary standard processes can be used in the micro-mechanics and/or semiconductor manufacture.

In one advantageous embodiment of the invention, it is provided that at least one cutback of the boundary wall is arranged between two layers and/or between two layer areas (hereinafter simply designated as "layers") of the layer stack, offset in relation to each other transverse to the layer planes, and that at least one locking projection of the coupling counterpart, in the locking position, engages into the intermediate space formed between these layers. The coupling counterpart is then fixed in both its axial directions, namely in plug-in and extraction directions, by means of the locking projection, projecting in relation to the cutback, between the layers of the boundary wall arranged transverse to the layer planes of the layer stack on both sides of the cutback.

A bilateral axial fixation of the conductor on the boundary wall of the receiver can also be assured in that at least one layer arranged between two cutbacks forms a projection on the boundary wall, and in that, in the locking position of the coupling, transverse to the layering plane of this layer, respectively at least one locking projection of the coupling counterpart is arranged. With this embodiment of the invention, a projection of the boundary wall thus engages in a receiver of the coupling counterpart transverse to the layer planes of the layer stack restricted on both sides by locking projections.

In one embodiment of the invention, it is provided that the boundary wall of the receiver depression forms a laterally open sliding guide for the coupling counterpart, and that the coupling counterpart is moveable out of a pre-assembly position, in which the locking projection is out of engagement with the cutback of the micro-mechanical component, parallel to the layer planes of the layer stack, engaging with the locking projection into the cutback of the boundary wall. The coupling counterpart is then separably connectable with the micro-mechanical component by plugging in and retracting of the sliding guide.

In an especially advantageous embodiment of the invention, the coupling counterpart has on its exterior at least one resilient element which carries at least one stop projection on its exterior which, in operating position, engages into the cutback of the coupling receiver, whereby the stop projection in the coupling position of the coupling is directable against the restoring force of the resilient element from a locking position into an unlocking position. In this way, there results a plug-in coupling constructed as a stop connection which, by axially plugging the coupling elements into one another, or retracting them from one another, allows a simple and optionally separable joining of the coupling counterpart with the coupling receiver.

It is provided in connection with an especially advantageous embodiment of the invention that the coupling counterpart is constructed as the connection head of an optical and/or electrical conductor, and that the coupling receiver has at least one electrically and/or optically conducting element arranged in the receiver depression or bordering on it, which, in the coupling position of the coupling, stands in conducting connection with the optical and/or electrical conductor. The electrical and/or optical conductor here can be inserted into the receiver depression transverse in relation to the layer planes of the layer stack layers. Advantageously, in this way, for connecting the conductor with the coupling receiver situated, by way of example, on a micro-mechanical component, only a comparatively small area of the surface of the micro-mechanical component is required, so that the coupling can have correspondingly small dimensions.

With a coupling receiver which is part of a semiconductor chip, there thereby results a correspondingly small chip surface which allows an economical manufacture of the semiconductor chip. The receiver depression arranged in the layer stack enables in the manufacture of the connection, a simple, layer by layer installation of the cutback into the boundary wall of the receiver depression, whereby in micro-mechanics and/or semiconductor manufacture, customary standard processes are used. Since the optical and/or electrical conductor is joined in a form-locking manner with the coupling receiver, the conductor can be fixed in the receiver depression, while avoiding clamping forces. Mechanical tensions in the conductor, which can impair the optical characteristics of an optical conductor, are thereby avoided. It should be mentioned that the receiver depression can have a bottom which can serve, in the inserted position of the conductor, as a stop for the front face end of the conductor facing the micro-mechanical component.

It is advantageous if the resilient element having the stop projection is constructed as a spring tongue and/or as an annular jacket area of the connection head. An electrically and/or optically conducting core of the conductor engaging into the interior of the connection head can then, while retaining its cross section, be guided into the interior of the receiver depression and optionally up to its bottom, whereby the stop projection and the resilient element are arranged outside the core on the connection head. In this way, mechanical stresses in the core of the conductor are avoided to the greatest extent.

A preferred, especially advantageous embodiment of the invention provides that the electrically and/or optically conducting element of the coupling receiver, standing in conducting connection with the coupling counterpart engaging in the receiver depression, is formed by at least one electrically and/or optically conducting layer area bordering on the receiver depression, and that the coupling counterpart has at least one electrically and/or optically conducting area standing in conducting connection with the conductor which, in the coupling position of the coupling, is connected with the electrically and/or optically conducting layer of the layer stack in an electrically and/or optically conducting manner.

The coupling receiver can then, for example, be part of a micro-mechanical component, especially of a semiconductor chip. The electrically and/or optically conducting layer of the layer stack can then be connected with electrical and/or optical track conductors of the micro-mechanical component, which can be finished in a simple manner during the manufacture of the component by masking the electrically and/or optically conducting layer of the layer stack. Optionally, even several layers of the layer stack of the coupling receiver can be simultaneously connected with the conductor in an electrically and/or optically conducting manner. There thus results an especially low electrical and/or optical contact resistance between the coupling receiver and the conductor. Expediently, the conducting connection takes place through the resilient element of the coupling counterpart in that the resilient element is pressed, by the restoring force of its material in the operating position, on an electrically and/or optically conducting layer. Also, by this measure, an especially low electrical and/or optical contact resistance can be assured between the micro-mechanical component and the conductor. The compressive force can instead be generated, however, in that layer stack is made entirely or area-wise of an elastic material, and in that the end region of the conductor inserted or to be inserted into the receiver depression has a somewhat larger clear width than the receiver depth.

In an especially advantageous embodiment of the invention, it is provided that, in the coupling position of the coupling, the electrically and/or optically conducting element of the coupling receiver standing in conducting contact with the electrically and/or optically conductor is arranged on the bottom of the receiver depression facing the end face of the conductor, and is formed by an electrically and/or optically conducting layer situated on the bottom of the receiver depression. In this way, with an optical conductor, the optical radiation can be especially well transmitted between the coupling receiver and the conductor constructed, for example, as an optical fiber. On the bottom of the receiver depression an optical transmission element, for example a laser diode, and/or an optical receiving element, for example a photodiode or a photoelectric transmitter, can optionally be arranged.

In an especially advantageous embodiment of the invention, the conductor has an optically conductive core, which has a metal sheath on the outside. The sheath then serves, on the one hand, as a reflector to guide the optical radiation in the optically conductive core, and can, on the other hand, be used instead for transmitting electrical signals. Here, the core of the conductor engaging into the receiver depression can stand in conducting connection with an optically conductive element situated on the bottom of the receiver depression, and the metal sheath of the conductor can stand in conducting connection with at least one electrically conductive layer of the layer stack laterally bordering on the receiver depression. Consequently, there results a compactly constructed coupling for simultaneous transmission of electrical and optical signals.

In a further, advantageous embodiment of the invention, the coupling counterpart is a connection head of a tube or pipe conduit, wherein the tube or pipe conduit has at least one channel for a medium to be studied, which is connected with an opening situated on the coupling counterpart, wherein the opening of the coupling counterpart in the coupling position is sealed against the coupling receiver, and wherein at least one sensor for examining the medium situated in the channel is arranged on the bottom of the receiver depression of the coupling receiver in the area of the opening of the coupling counterpart. A chemically aggressive and/or electrically conductive medium, for example, can then be fed through the channel to the sensor situated on the coupling receiver. The coupling receiver and the sensor can, for example, be a part of a semiconductor chip or a micro-mechanical component. By the seal situated between the channel and the coupling receiver, the medium is screened from outside and especially also kept away from areas of the semiconductor chip or the micro-mechanical component on which the medium could cause corrosion and/or impair the electrical function of the semiconductor chip or the component.

With regard to the process for manufacturing the coupling of the invention, the above-mentioned objective is accomplished in that the receiver depression is introduced after positioning the layers into the layer stack. Thus, the individual layers are first stacked into a layer stack, and only then is the receiver depression introduced into the layers. The process has the advantage that it can be well integrated into the finishing process for manufacturing of a semiconductor forming the coupling receiver, especially a CMOS chip. The layer stack layers applied in the manufacture of the layer stack, for example to a substrate layer, can namely additionally also be used for the manufacture of other structures to be integrated into the semiconductor chip, for example printed circuits, transistors or optical sending and/or receiving elements, in that these layers are masked in the usual manner, for example by means of a photo-lithographic process.

Since the recess depression can only be introduced after finishing all layers necessary for the layer stack, the respective photo-resist layers required for the photo-lithographic manufacture of the additional structures can be applied to the individual layers installed throughout the layer stack, before the receiving depression is created in the layer stack. It is thereby avoided that the receiver depression prevents the spread of the photo-resist applied to the layers, for example in a spraying process, on the surface of the individual layers. Also, the formation of cracks, which can occur when applying a layer on an edge or an offset, is avoided by subsequent introduction of the recess depression into the layer stack.

It is advantageous if the layer stack is brought into contact with an etching agent for introducing the receiver depression, and if the layer materials of the individual layers of the layer stack are selected for molding a cutback into the boundary wall of the receiver depression, such that they have different etch rates with reference to the etching agent. The boundary wall of the receiver depression can then be manufactured simply by underetching the layers of the layer stack.

BRIEF DESCRIPTION OF SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
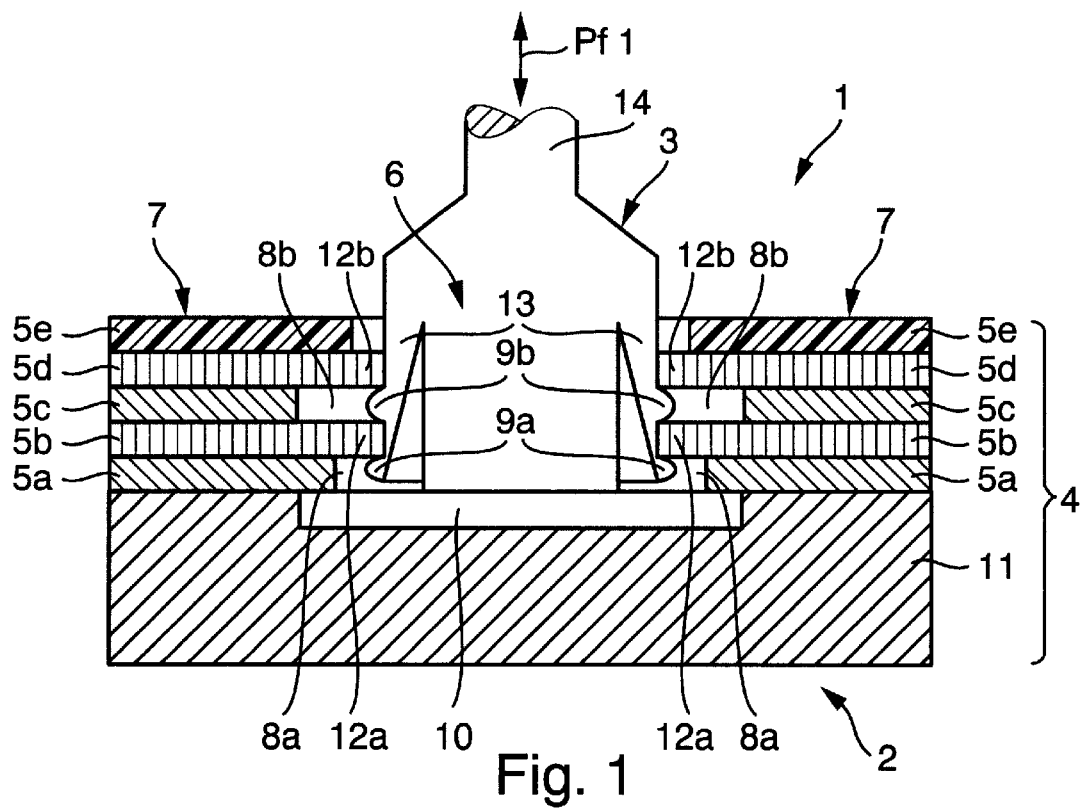
FIG. 1 is a cross section through a coupling of the invention, which has a coupling receiver and a coupling counterpart connected with an optical conductor.

A coupling, designated overall with 1 depicted in FIG. 1, has a coupling receiver 2 constructed as a micro-mechanical component and a coupling counterpart 3 connected or connectable with it. The coupling counterpart 3 is connected with an optical conductor 14. The coupling receiver 2 has a layer stack 4 with several layers 5a, 5b, 5c, 5d, 5e in which a receiver depression 6 is arranged, which extends transverse to the layer planes of layers 5a, 5b, 5c, 5d, 5e over several layers 5a, 5b, 5c, 5d, 5e.

Proceeding from the surface 7 of the layer stack 4 bordering on the receiver depression 6 toward the bottom of the receiver depression 6, the lateral boundary wall of the receiver depression 6 has several cutbacks 8a, 8b, which are respectively formed by layers 5a, 5c receding in relation to adjacent layers 5b, 5d.

In the coupling position the conductor 14 is oriented with its end region facing the coupling receiver 2 transverse, and in particular orthogonal, to the layer planes of layers 5a, 5b, 5c, 5d, 5e, and it engages with the end region into the receiver depression 6. On its outside the conductor 14 has several laterally projecting locking projections 9a, 9b, which in the coupling position respectively engage into a cutback of the lateral boundary wall of the receiver depression 6 of the micro-mechanical component 2. The conductor 14 is thereby connected with the coupling receiver 2 in a form-locking manner in the coupling position.

Figure 3:
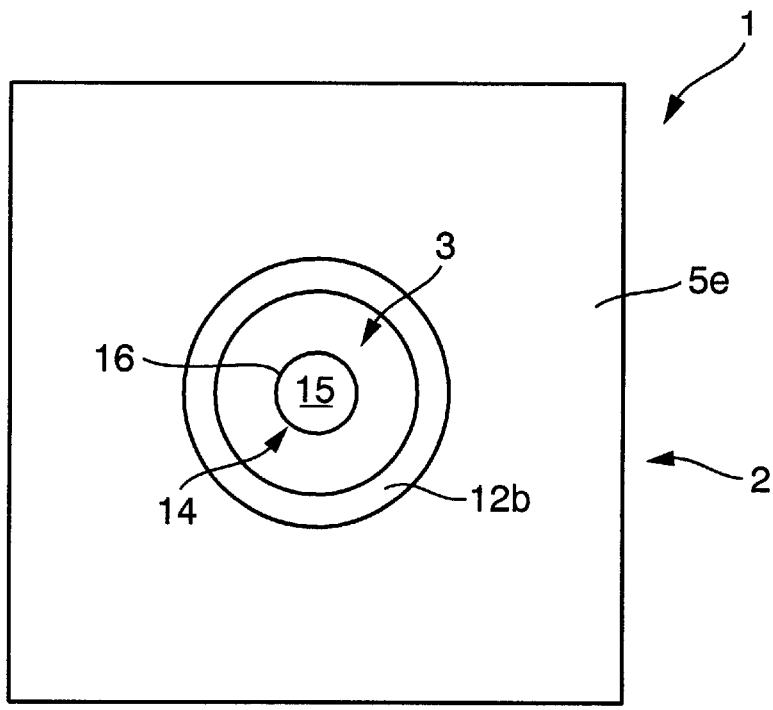
FIG. 3 is a view of the coupling shown in FIG. 2, wherein the optical conductor is represented in cross section.

The front end of the conductor 14 faces, in the coupling position, a transmitting and/or receiving element 10 arranged on the bottom of the receiving depression 6 and stands in optically-conducting connection therewith. That is, optical signals which are fed into the conductor 14, on the end facing away from micro-mechanical component 2, can be transmitted to the transmitting and/or receiving element 10, and an optical beam radiated from the transmitter and/or receiving element 10 can be coupled into the optical conductor. As is especially well recognizable from FIG. 3, only a comparatively small base area of the coupling receiver 2 is needed for connecting the conductor 14 with the coupling receiver 2, which can, for example, be provided on a semiconductor chip.

In the manufacture of the micro-mechanical component 2, the individual layers 5a, 5b, 5c, 5d, 5e of the layer stack are first applied to a substrate layer 11, for example by vacuum evaporation, sputtering, galvanizing or similar processes known per se for generating a layer. After finishing the layer stack 4, an etch-proof mask is applied to the layer 5e constructed as a passivation layer which has an interruption or a recess in the area of the receiver depression 6 to be introduced into the stack layer. After this, the surface 7 of the layer stack 4 facing away from the substrate layer 11 and having a mask is brought into contact with an etching agent for introducing the receiver depression 6. For introducing the profiling having the cutbacks 8a, 8b and the projections 12a, 12b respectively adjacent thereto in the boundary wall of the receiver depression 6, the individual layers 5a, 5b, 5c, 5d, 5e have different degrees of etching with respect to the etching agent.

Figure 2:
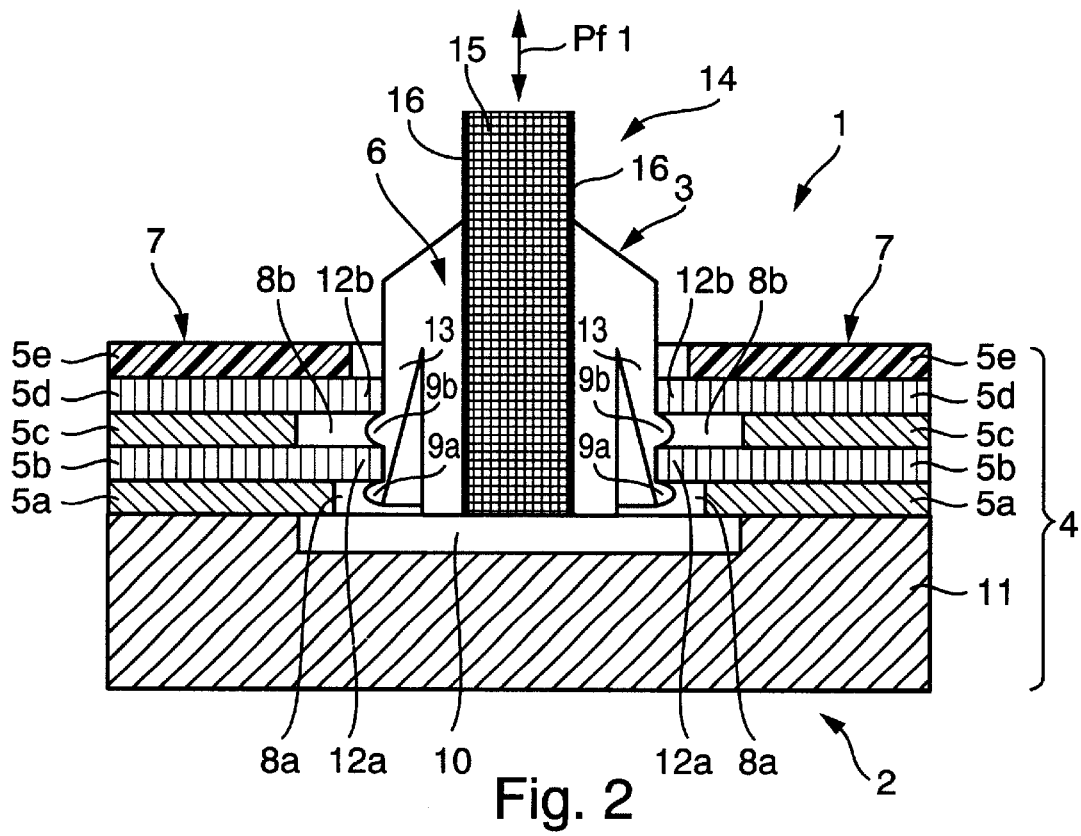
FIG. 2 is a representation similar to FIG. 1, wherein, however, the coupling counterpart is constructed as a casing, into which an optically conductive core of the conductor is inserted.

In the embodiments according to FIGS. 1 and 2, for example, the layers 5a, 5c, 5e have a greater etching rate than the layers 5b, 5d. In the area of layers 5a, 5c the cutbacks 8a, 8b then result by underetching. Since the receiver depression 6 is first etched into the layer stack after finishing this, the manufacturing process for the coupling receiver 2 can be well integrated into the finishing process of semiconductor manufacturing. The coupling receiver 2 is thereby economically producible. The receiver depression 6 can, for example, be introduced into the layer stack 4 with high dimensional and positional exactitude using photolithography. The end region of the conductor 14 inserted into the receiver depression 6 is consequently, in the coupling position, positioned exactly on the optical transmitting and/or receiving element 10.

It is recognizable from FIG. 1 that the cutbacks 8a, 8b of the boundary wall are arranged between two layers 11, 5b or 5b, 5d of the layer stack. At least one respective locking projection 9a, 9b of the conductor 14 engages in the intermediate space respectively formed thereby. The conductor 14 is thus fixed in both axial directions, designated by the double arrow Pf 1, as well as in the receiver depression 6.

In FIG. 1 it is further recognizable that the projections 12a, 12b are formed respectively by layers 5b, 5d arranged between two cutbacks 5a, 5c or 5c, 5e. In the coupling position of the coupling, at least one locking projection 9a, 9b of the conductor 14 is respectively arranged transverse to the layer plane of the layer 5b on both sides of layer 5b. By this measure as well, the conductor 14 is fixed in the receiver depression 6 in both directions, designated by the double arrow Pf 1.

Figure 4:
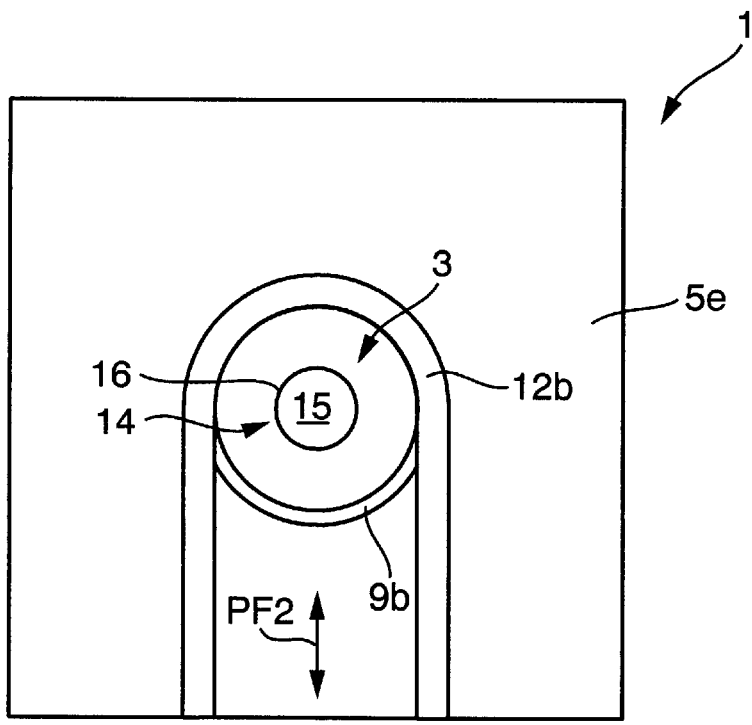
FIG. 4 is a representation similar to FIG. 3 wherein, however, the coupling receiver is constructed as a laterally open sliding guide.

In the embodiment according to FIG. 4 the coupling counterpart 3 is constructed as a connection head which broadens the cross section of the optically conductive conductor 14. The boundary wall of the receiver depression 6 is constructed as a laterally open sliding guide, into which the coupling counterpart 3 is slideable parallel to the layer planes of the layer stack 4 in the direction of the arrow Pf 2 from a pre-assembly position in which the locking projections 9a, 9b are out of engagement with the cutbacks 8a, 8b of the coupling receiver 2 into a locking position in which the locking projections 9a, 9b of the coupling counterpart 3 engage into the cutbacks 8a, 8b of the boundary wall. The coupling elements are thus plugable onto one another or retractable from one another in a simple manner.

In the embodiments according to FIGS. 1 and 2, the coupling counterpart 3 has on its outer periphery several resilient elements 13 constructed as annular jacket elements which carry on their exterior locking projections 9a, 9b respectively constructed as stop projections. In the coupling position, the locking projections 9a, 9b engage respectively into cutbacks 8a, 8b of the boundary wall of the receiver depression 6. For inserting and withdrawing the coupling counterpart 3 from the receiver recess 6, the locking projections 9a, 9b are guidable respectively against the restoring force of the resilient element 13 transverse to the extension direction of the conductor 14 out of a locked position in which the locking projections 9a, 9b engage into the cutbacks 8a, 8b into an unlocked position in which the guide and/or locking projections 9a, 9b release the cutbacks 8a, 8b. The coupling 1 is thus constructed as a releasable plug coupling and consequently enables a simple assembly. In FIGS. 1 and 2 it is recognizable that the locking projections 9a, 9b have respective insertion bevels and retraction bevels which facilitate plugging the coupling elements into each other and/or retracting them from each other. It should also be mentioned that the annular jacket areas forming the resilient elements 13 can be spaced from one another by slots in the peripheral direction of the conductor 14.

In the embodiment according to FIG. 2, the conductor 14 has an optically conductive core 15, which is surrounded on its exterior by a metal sheath 16. The sheath 16 is connected in an electrically conducting manner with the coupling counterpart 3 made of an electrically conducting material and/or having an electrically conducting coating. In FIG. 2 it is recognizable that the coupling counterpart 3 has an inner cavity constructed as a through hole into which the core 15 with the metal sheath is inserted. Here, the front end of the core 15 faces toward the optical transmitting and/or receiving element 10 arranged on the bottom of the receiver depression 6. Electrically conductive stack layers 5b, 5d of the coupling receiver 2 engage laterally on the electrically conducting coupling counterpart 3 connected with the metal sheath 16 of the conductor 14. In FIG. 2 it is further recognizable that the resilient elements 13 of the coupling counterpart, in the coupling position, engage on the boundary wall of the receiver depression 6, respectively simultaneously on layers 5b, 5d, and act upon these with spring pressure. A well-conducting electrical connection between the metal sheath 16 of the core 15 and the electrically conducting layers 5b, 5d is thereby attained. Overall, a compactly constructed coupling consequently results 1, which makes possible an electrical as well as an optical connection of the conductor 14 with the coupling receiver 2.

Figure 5:
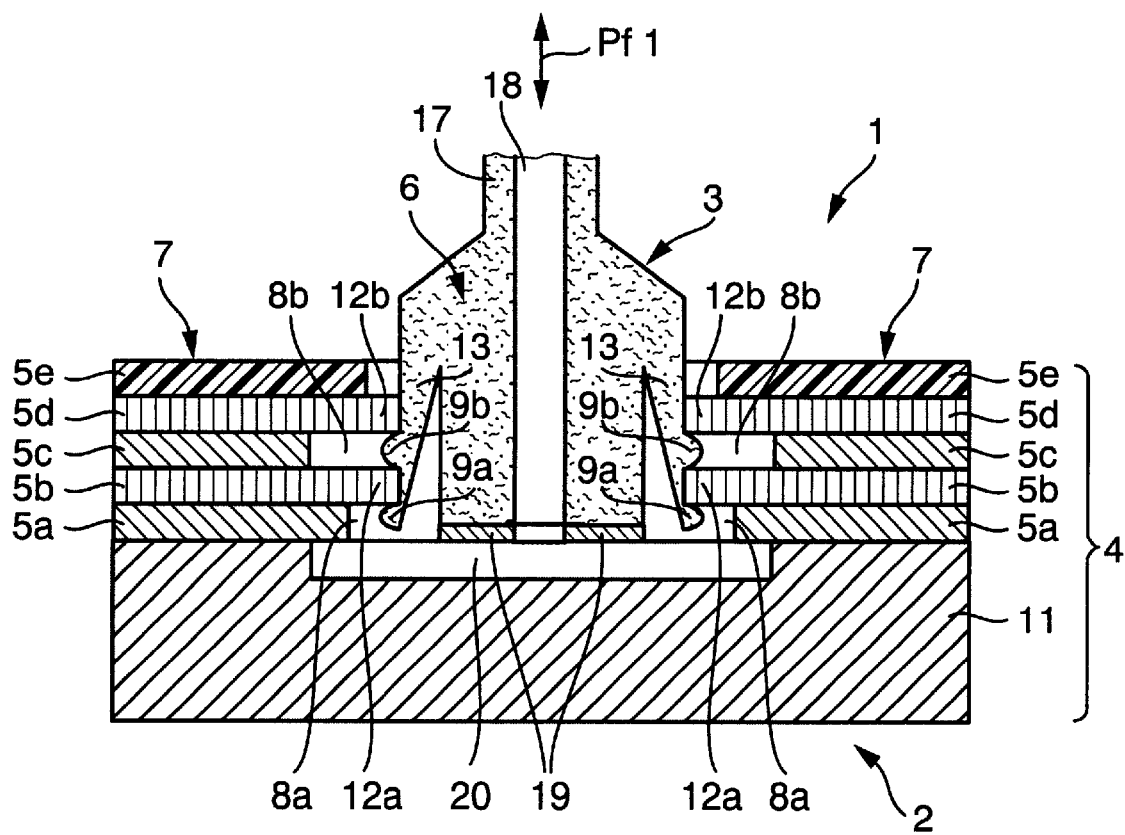
FIG. 5 is a cross section through a coupling of the invention, which has a coupling receiver and a coupling counterpart connected with a tube or pipe conduit.

Also in the embodiment according to FIG. 5, the coupling counterpart 3 has on its outer periphery several resilient elements 13 constructed as annular jacket areas, which carry on their exterior locking projections 9a, 9b, constructed respectively as stop projections which engage in cutbacks 8a, 8b of the boundary wall of the receiver depression 6. With the coupling counterpart 3, a tube or pipe conduit 17 is connected, which has a channel 18 into which a medium to be studied is filled or fillable. The channel penetrates the coupling counterpart 3 and is connected with an opening of the coupling counterpart 3, which in the coupling position faces the bottom of the receiver depression 6. The opening is surrounded by a sealing ring 19, which in the coupling position, on the one hand, lies on the bottom of the receiver depression 6 and, on the other hand, lies on the end region of the coupling counterpart 3 facing the bottom, and which seals the opening against the medium.

On the bottom of the receiver depression 6 the coupling receiver 2 has a sensor 20 for studying the medium. The sensor is arranged with its active sensor surface within the cross section of the opening of the coupling counterpart 3 and there borders on the channel 18. The measuring device depicted in FIG. 5 is especially suited for the study of chemically aggressive and/or electrically conductive media, wherein these are kept away from the layers 5a, 5b, 5c, 5d, 5e of the layer stack 4 by the coupling counterpart 3. Of course, the tube or pipe conduit 17 can have several channels 18, for example at least one feeder and at least one outlet channel. The sensor 20 can then be continuously or discontinuously subjected to flow by the medium to be studied.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A micro-mechanical coupling (1) comprising a coupling receiver (2) and a coupling counterpart (3) which in the coupling position is held in a receiver depression (6) of the coupling receiver, the coupling receiver (2) having a layer stack (4) with at least two layers (5a, 5b, 5c, 5d, 5e), the receiver depression (6) being arranged in the layer stack (4) and extending transverse to layer planes over the at least two layers (5a, 5b, 5c, 5d, 5e) of the stack (4), a lateral boundary wall of the receiver depression (6), proceeding from a surface (7) of the layer stack (4) bordering on the receiver depression (6) toward the interior of the receiver depression (6), having at least one cutback (8a, 8b) which is formed by a cutback layer (5a, 5c) of the at least two layers receding in relation to an adjacent layer (11, 5b, 5d) of the at least two layers, and the coupling counterpart (3) having laterally at least one locking projection (9a, 9b), which in the coupling position engages into the cutback (8a, 8b) of the coupling receiver (2).

2. The coupling according to claim 1, wherein the at least one cutback (8a, 8b) of the boundary wall is arranged between two of the adjacent layers (11, 5b, 5d) of the layer stack (4) offset in relation to each other transverse to the layer planes, and wherein the at least one locking projection (9a, 9b) of the coupling counterpart (3) engages in a locking position into an intermediate space formed between the two adjacent layers (11, 5b, 5d).

3. The coupling according to claim 1, wherein at least one of the adjacent layers (5b, 5d) arranged between at least two of the cutbacks (8a, 8b) forms a projection (12a, 12b) on the boundary wall, and wherein in a locking position of the coupling (1) the at least one respective locking projection (9a, 9b) of the coupling counterpart is arranged transverse to a layer plane of the adjacent layer (5b, 5d) on both sides of the adjacent layer (5b, 5d).

4. The coupling according to claim 1, wherein the boundary wall of the receiver depression (6) forms a laterally open sliding guide for the coupling counterpart (3), and wherein the coupling counterpart (3) is slideable parallel to a layer plane of the layer stack (4) from a pre-assembly position in which the at least one locking projection (9a, 9b) is out of engagement with the cutback (8a, 8b) of the coupling receiver (2) into a locking position with the locking projection (9a, 9b) of the boundary wall.

5. The coupling according to claim 1, wherein the coupling counterpart has on its exterior at least one resilient element (13) which carries on its exterior at least one locking projection, which in operation engages into the cutback (8a, 8b) of the coupling receiver (2), and wherein the at least one locking projection in a coupling position of the coupling (1) is guidable against a restoring force of the at least one resilient element (13) from a locked position into an unlocked position.

6. The coupling according to claim 5, wherein the coupling counterpart (3) is constructed as a connection head of conductor (14) selected from the group consisting of optical conductors and electrical conductors, and wherein the coupling receiver (2) has at least one conductive element selected from the group consisting of electrically conductive elements and optically conductive elements arranged in the receiver depression (6) or bordering upon it, which in a coupling position of the coupling (1) stands in conducting connection with the conductor (14).

7. The coupling according to claim 6, wherein the resilient element (13) having the locking projection is constructed as a spring tongue or as an annular jacket area of the connection head.

8. Coupling according to claim 6, wherein the conductive element is formed by at least one conductive layer (5a, 5b, 5c, 5d, 5e) selected from the group consisting of electrically conductive layers and optically conductive layers of the layer stack (4) bordering upon the receiver depression (6), and wherein the coupling counterpart (3) has at least one conductive region standing in conducting connection with the conductor (14), which in a coupling position of the coupler (1) is connected with the conductive layer (5a, 5b, 5c, 5d, 5e) in a conducting manner.

9. The coupling according to claim 8, wherein in the coupling position of the coupling (1) the conductive element of the coupling receiver (2) standing in conducting contact with the conductor (14) is arranged on a bottom of the receiver depression (6) facing a front end of the conductor (14) and is formed by a conductive layer situated on the bottom of receiver depression (6).

10. The coupling according to claim 9, wherein the conductive element situated on the bottom of the coupling receiver is constructed as an optical element (10) selected from the group consisting of optical transmitting elements and optical receiving elements.

11. The coupling according to claim 6, wherein the conductor (14) has an optically conductive core (15) which has a metal sheath (16) on its exterior.

12. The coupling according to claim 11, wherein the core (15) engages in the receiver depression (6) and stands in conducting connection with an optically conductive element situated on a bottom of the receiver depression (6), and wherein the metal sheath (16) stands in conducting connection with at least one electrically conductive layer (5a, 5b, 5c, 5d, 5e) bordering laterally on the receiver depression (6).

13. The coupling according to claim 1, wherein the coupling counterpart (3) is a connection head of a tube or pipe conduit (17), wherein the tube or pipe conduit (17) has at least one channel (18) for a medium to be studied, the channel being connected with an opening situated on the coupling counterpart (3), wherein the opening in the coupling position is sealed off against the coupling receiver (2), and wherein at least one sensor (20) for studying the medium situated in the channel (18) is arranged on the bottom of the receiving depression (6) in an area of the opening.

14. A process for manufacturing the coupling according to claim 1, wherein the receiver depression (6) is inserted into the layer stack (4) after finishing the layer stack (4).

15. The process according to claim 14, wherein the layer stack (4) is brought into contact with an etching agent for creating the receiver depression (6), and wherein layer materials of individual layers (5a, 5b, 5c, 5d, 5e) of the layer stack (4) are selected for molding a cutback (8a, 8b) into the boundary wall such that the materials have different etching rates in relation to the etching agent.

* * * * *